United States Patent
Sutherland et al.

(10) Patent No.: US 8,341,600 B2
(45) Date of Patent: Dec. 25, 2012

(54) TAGGING AND LOGICAL GROUPING OF ITEMS IN SOURCE CODE CHANGE LISTS

(75) Inventors: Andrew Sutherland, Redmond, WA (US); Gina D Venolia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 12/032,005

(22) Filed: Feb. 15, 2008

(65) Prior Publication Data

US 2009/0210860 A1  Aug. 20, 2009

(51) Int. Cl.
*G06F 9/44* (2006.01)
*G06F 9/45* (2006.01)

(52) U.S. Cl. .................. 717/126; 717/120; 717/125

(58) Field of Classification Search ........... 717/120–129
See application file for complete search history.

(56) References Cited

U.S. PATENT DOCUMENTS

| | | | |
|---|---|---|---|
| 5,761,656 A | 6/1998 | Ben-Shachar | |
| 5,898,872 A | 4/1999 | Richley | |
| 5,907,705 A * | 5/1999 | Carter | 717/122 |
| 6,223,337 B1 * | 4/2001 | Blume | 717/126 |
| 6,662,357 B1 * | 12/2003 | Bowman-Amuah | 717/120 |
| 6,961,931 B2 | 11/2005 | Fischer | |
| 7,080,351 B1 * | 7/2006 | Kirkpatrick et al. | 717/102 |
| 7,225,430 B2 * | 5/2007 | Eatough et al. | 717/127 |
| 7,246,104 B2 * | 7/2007 | Stickler | 1/1 |
| 7,448,024 B2 * | 11/2008 | Breeden et al. | 717/125 |
| 7,596,778 B2 * | 9/2009 | Kolawa et al. | 717/126 |
| 7,603,664 B2 * | 10/2009 | Dutt et al. | 717/153 |
| 7,778,866 B2 * | 8/2010 | Hughes | 705/7.42 |
| 7,810,070 B2 * | 10/2010 | Nasuti et al. | 717/124 |
| 7,849,509 B2 * | 12/2010 | Venkatapathy et al. | 726/25 |
| 7,870,535 B2 * | 1/2011 | Rippert et al. | 717/100 |
| 7,913,229 B2 * | 3/2011 | Squires et al. | 717/124 |
| 7,930,053 B2 * | 4/2011 | Loy et al. | 700/109 |
| 7,996,829 B2 * | 8/2011 | Depew et al. | 717/170 |
| 8,072,641 B2 * | 12/2011 | Herr | 358/1.15 |
| 8,132,153 B2 * | 3/2012 | Subramanyam | 717/121 |
| 8,141,039 B2 * | 3/2012 | D'Amore | 717/120 |
| 2003/0131313 A1 | 7/2003 | Flanagan | |
| 2005/0114841 A1 | 5/2005 | Moskowitz et al. | |
| 2005/0235247 A1 | 10/2005 | Francis et al. | |
| 2006/0136510 A1 | 6/2006 | Voronov et al. | |
| 2006/0236301 A1 | 10/2006 | Minium et al. | |
| 2007/0006152 A1 | 1/2007 | Ahmed et al. | |
| 2007/0028171 A1 | 2/2007 | MacLaurin | |

OTHER PUBLICATIONS

Harel et al, "Estimating the number of faults reminining in software code documents inspected with iterative code reviews", IEEE, pp. 1-10, 2005.*
Belli et al, "Emprical performance analysis of comuter supported code reviews", IEEE, pp. 245-255, 1997.*
Zazworka et al, "Tool supported detection and judgment of noncorformance in process execution", IEEE, pp. 312-323, 2009.*
Turner et al, "Misunderstandings about obejct oriented design: experiences using code reviews", ACM SIGCSE, pp. 97-101, 2008.*

(Continued)

*Primary Examiner* — Anil Khatri
(74) *Attorney, Agent, or Firm* — Lee & Hayes, PLLC (57) ABSTRACT

A tool facilitating organizing code review via tagging changes in the code such that developer reasoning and reviewer comments are captured during the development process; thus documenting the development process. The tool providing intuitive presentation of changes and change sets based on the purpose of the change. The tool enabling retrieval of the information documenting developer and reviewer rationale during development and after development is complete.

19 Claims, 10 Drawing Sheets

OTHER PUBLICATIONS

Addamio, "Reviewing Managed Code", at <<http://msdn2.microsoft.com/en-us/library/bb278146.aspx>>, Microsoft Corporation, 2007, pp. 6.

"GNU GLOBAL source code tag system", at <<http://www.gnu.org/software/global/>>, Tama Communications Corporation, 2007, pp. 2.

Matam, "Effective Code Reviews", at <<http://www.codewalk.com/code_review.html>>, Mar. 7, 2007, pp. 4.

"Review Tag Tool", at <<http://codeminer.adventnet.com/cvs-manager/review_tag_tool.html>>, AdventNet, Inc., 2007, pp. 3.

* cited by examiner

TAGGING AND LOGICAL GROUPING OF ITEMS IN SOURCE CODE CHANGE LISTS

BACKGROUND

Code reviews are a process that software programmers use to catch bugs before the bugs become committed into a software product. Generally, the process begins with a developer being assigned a bug to fix. The developer develops a fix for the bug and codes the fix. Then one or more reviewers review the fix. The review process ensures that fixes do not produce unintended consequences and that the fix corresponds with accepted coding practices. After a fix is reviewed and approved, then it is committed to the code.

Currently two main models of doing code reviews exist. The first model is all over-the-shoulder (OTS) approach. During OTS code review, the reviewer(s) literally looks at code revisions over the shoulder of the author while the revision is being completed. A version of OTS occurs with the revisions being displayed on a large screen, in a conference room, for example. In the OTS code review model, comments and discussion between the reviewer and the author occur in real time, but typically there is no record of the conversation.

The second current model of doing code reviews occurs via email or other communication technology such as workflow tools or source code comments. In the second current model, the author packages code changes from the fix and emails those changes to the reviewer(s). Then the reviewer opens the package and a back-and-forth email discussion ensues in an attempt for the reviewer and author to come to an understanding of why certain changes were undertaken in certain ways. The emails produce a record of this conversation, but the record is of limited value due to its unwieldy nature. In each of the current models, each particular code change is either accepted, or it is rejected, or it is postponed.

Tools exist for performing the acceptance, rejection, or postponing of changes in code reviews. In such current tools, differences between the code with a bug and the code being proposed are organized by file order, and then the differences are organized by their respective positions within each file. This organization is contrary to the way that developers think about the bugs they have been assigned to fix and other tasks they are assigned to perform.

SUMMARY

A method and system for facilitating tagging and logical grouping of items in source code change lists via a Code Review History (CRH) Tool, which is implemented independently or as a part of a Code Review History System (CRHS) are described herein. In an aspect of at least one embodiment, the CRHTool facilitates organizing code review via tagging changes in the code such that author/developer reasoning and reviewer comments are captured during the development process. In an aspect of at least one embodiment, the CRHTool provides integration which leverages the knowledge generated during the code review process by facilitating capture and storage for later retrieval of author/developer and reviewer rationale organized by specific tasks or activities. In an aspect of at least one embodiment, the CRHTool provides direct support of current work practices based on the purpose of the change. In an aspect of at least one embodiment, the CRHTool enables retrieval of information documenting author/developer and reviewer rationale during software development and after software development is complete.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The same numbers are used throughout the disclosure and figures to reference like components and features.

DETAILED DESCRIPTION

Overview

A Code Review History (CRH) Tool enables organizing code review via tagging changes in the code such that author/developer reasoning and reviewer comments are captured during the development process. In another aspect, the CRHTool provides integration which leverages the knowledge generated during the code review process by facilitating capture and storage for later retrieval of author/developer and reviewer rationale organized by specific tasks or activities. In another aspect, the CRHTool provides intuitive presentation of changes and change sets based on the purpose of the change. In another aspect, the CRHTool enables retrieval of information documenting author/developer and reviewer rationale during software development and after software development is complete.

An environment in which these tools may enable these and other techniques is set forth first below. This is followed by others sections describing various inventive techniques and exemplary embodiments of the tools. These sections describe exemplary ways in which the inventive tools enable organizing code review via tagging changes in the code such that author/developer reasoning and reviewer comments are associated with the task or activity driving the interaction. Processes of providing integration which leverages the knowledge generated during the code review process by facilitating real-time capture and storage for later retrieval of author/developer and reviewer rationale organized by the associated tasks or activities are described. Additionally, presentation of changes and change sets intuitively based on the purpose of the change are illustrated. Furthermore, processes of retrieving information documenting author/developer and reviewer rationale are explained.

Exemplary Operating Environment

Before describing the tools in detail, the following discussion of an exemplary operating environment is provided to assist the reader in understanding one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
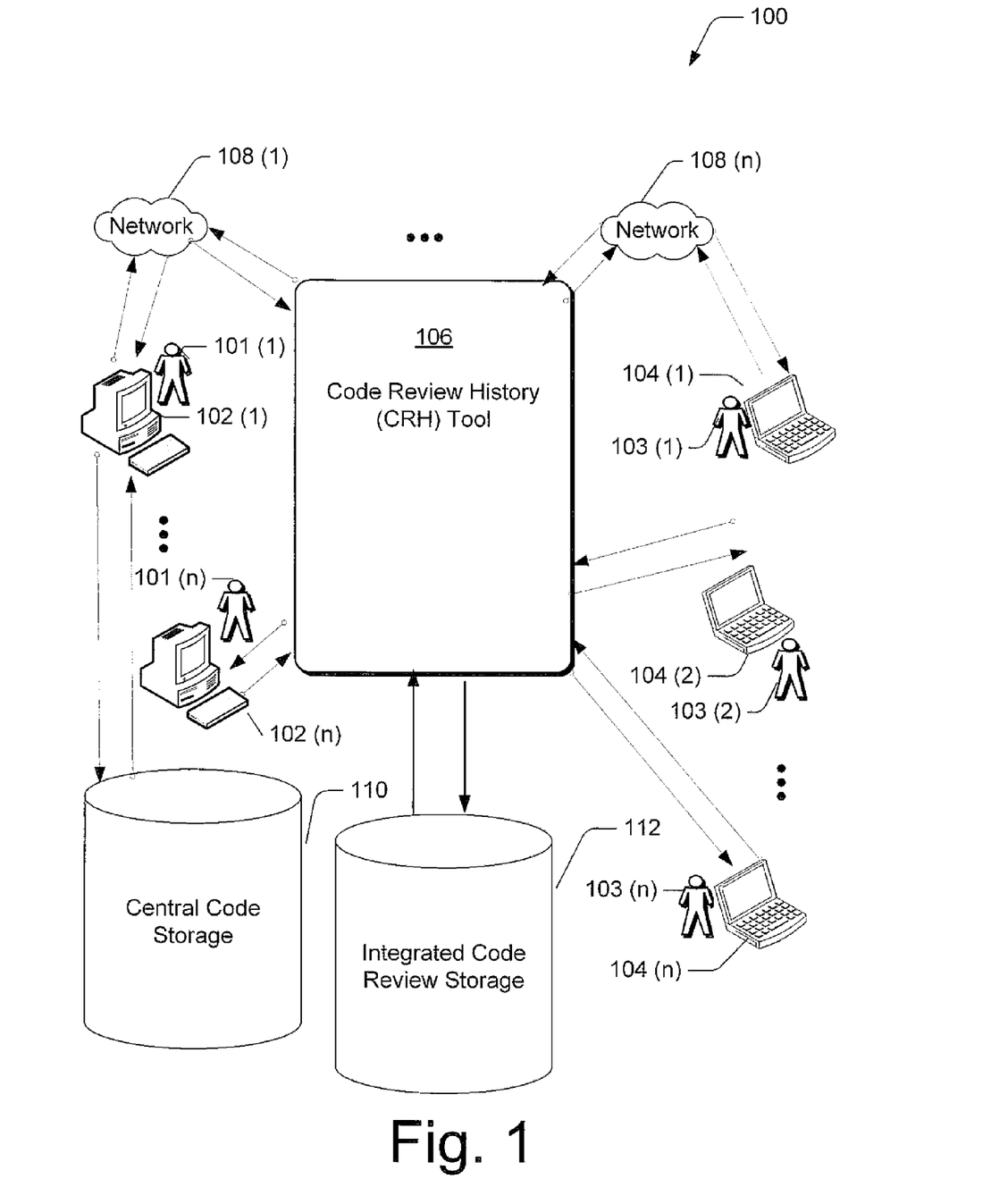
FIG. 1 illustrates an exemplary environment in which various embodiments of tagging and logical grouping of items in source code change lists can operate.

FIG. 1 illustrates one such operating environment generally at 100 comprising at least one author/developer 101 who uses at least one client computing device 102 having one or more client processor(s) and client computer-readable media.

The operating environment 100 further comprises at least one reviewer 103. Each reviewer 103 utilizes a computing device 104, similar to computing device 102. The computing device 104 utilized by the reviewer may be the same computing device as client 102, the same type of computing device as client 102, or it can be a separate or different computing device.

Each of the client(s) 102 and reviewer computing device(s) 104 interact via the inventive Code Review History (CRH) Tool 106. In at least one embodiment, such interaction occurs via integration of the CRHTool. In another embodiment, the interaction occurs via network 108 access to the CRHTool. The operating environment provides a variety of modes enabling the CRHTool. An exemplary mode includes impersonation mode providing for entry of reviewer approval via the author/developer login. Another exemplary mode includes screen capture on one or more of the client 102 or reviewer computing device 104. Yet another exemplary mode includes audio capture on one or more of the client 102 or reviewer computing device 104. Other modes are available, and are contemplated by the inventors as understood by those of skill in the art.

In order to facilitate some embodiments, the operating environment may also comprise one or more network(s) 108 and server(s) (not shown). In embodiments including a network, the network 108 enables communication between the client and the server(s), and can comprise a global or local wired or wireless network, such as the Internet, a local area network (LAN), or an intranet. In embodiments including a network, the computer-readable media comprises or has access to a browser, which is a module, program, or other entity capable of interacting with a network-enabled entity.

The operating environment also comprises central code storage(s) 110 and integrated code review storage 112. Although shown separately in an exemplary embodiment, in some embodiments they may be combined in one storage unit. Indeed, in some embodiments they may be included individually or combined within the CRHTool 106. Recovery of stored information capturing the author/developer and reviewer rationale is provided for access via a number of methods. In an aspect of at least one embodiment, historical access is provided via a query. In another aspect of at least one embodiment historical access is provided via selection of a segment of code. In yet another aspect of at least one embodiment historical access is provided via a last-in-first-out list of history, such as a blog-like history of the code. In an aspect of at least one embodiment, each entry presented provides access to at least one further level of information, for example via clickable links.

Although the subject matter is described in language specific to structural features and/or methodological acts, it is to be understood that the subject matter defined in the appended claims is not necessarily limited to the specific features or acts or to the structural proximity or sequences described herein. Rather, the specific features and acts described are disclosed as exemplary forms of implementing the claims.

Exemplary Operation

The following discussion describes exemplary ways in which the tools enable organizing code review via tagging changes in the code such that author/developer reasoning and reviewer comments are associated with the task driving the interaction. Developers think first about the bug they have been assigned to fix as a task which may include a variety of subtasks to be addressed. In the course of code review, important information about why particular approaches and solutions were coded in particular ways is articulated by author/developers and reviewers. The embodiments described herein capture a resulting dialogue and associate it with the corresponding code. Later, in at least one embodiment the tool maintains this information so that it remains accessible via a variety of modes. Thus, the tool provides a mechanism to preserve a recording of the rationale for particular code revisions. The task orientation of the tool leverages the thought process of the author/developer and reviewer to associate the code with the discussions about the rationale for its design.

Figure 2:
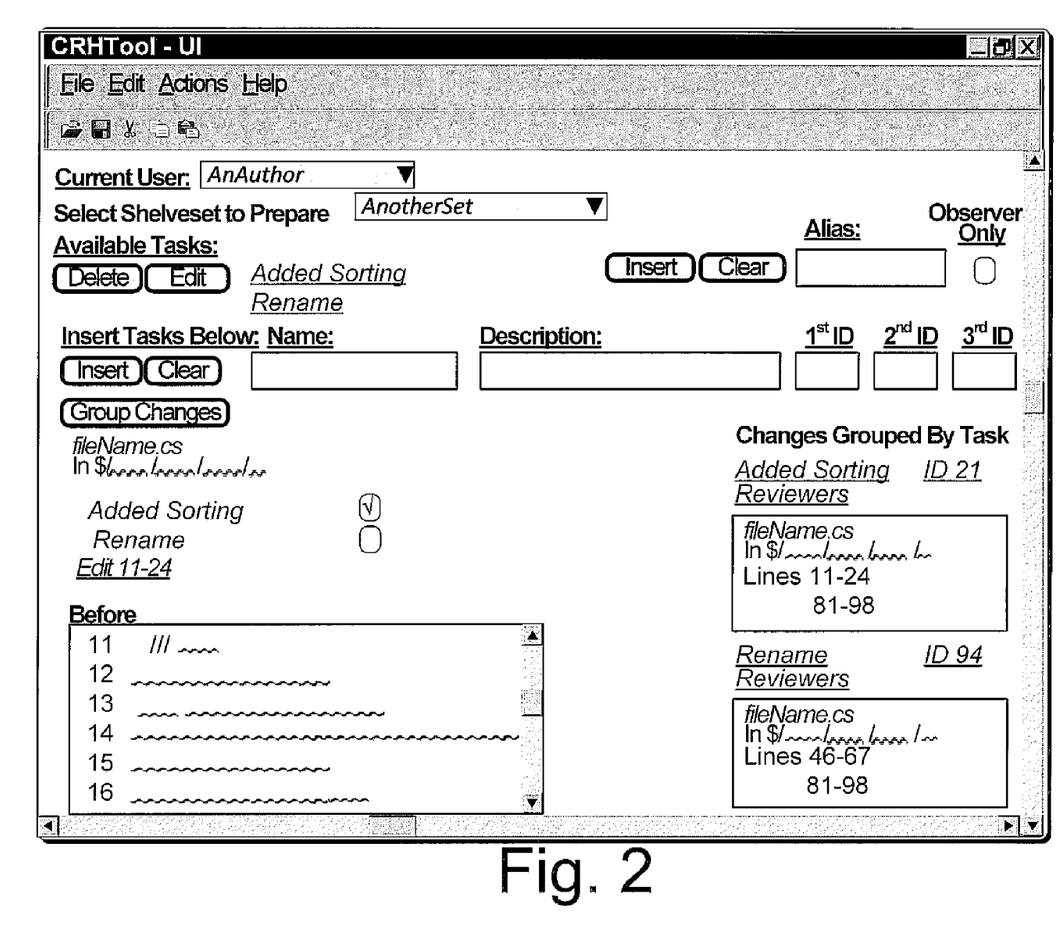
FIG. 2 illustrates an exemplary author/developer experience of one embodiment.

FIG. 2 is an exemplary screen shot illustrating an inventive interface an author/developer uses while preparing for a code review. From the presented change set, also called a shelveset, difference set, patch, session, etc. as known in the art, the author/developer will perform the upfront work of tagging each difference block, thereby associating each difference block with an associated task. In addition to the associated task, the author/developer's description of his or her reasoning and logic for particular actions is captured. Once the upfront preparation is complete for a particular change set, the differences are available, are presented in the order task association was identified, and are organized by task in an arrangeable task order, as well as the file order in respective areas of the interface.

Presented tasks can be rearranged via drag-and-drop and nudge functionalities. Furthermore, within each task, the order in which difference blocks are presented is rearrangeable in like manner. In one embodiment, differences may be associated with more than one task. In one embodiment the author/developer may break-up a presented difference block into multiple tasks. In one embodiment, multiple levels of grouping are provided. The author/developer assigns one or more reviewers either globally, i.e., to all tasks in the change set, or on a task-by-task basis.

Figure 3:
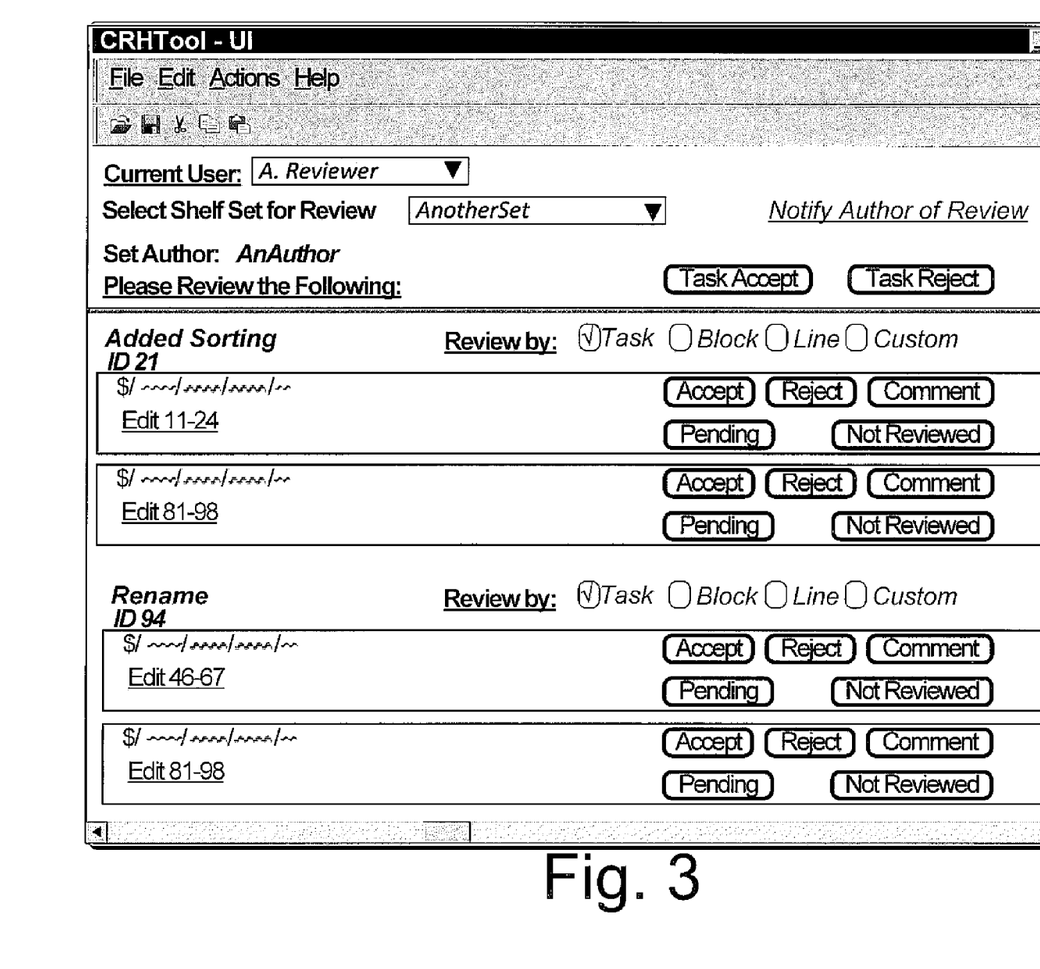
FIG. 3 illustrates an exemplary reviewer experience of one embodiment.

FIG. 3 is an exemplary screen shot illustrating an inventive interface that a reviewer may use while reviewing, in accordance with one or more embodiments of tagging and logical grouping of items in source code change lists. From the presented waiting reviews, a reviewer has the ability via the inventive interface to review and take action at a variety of levels of granularity via different presentation selections. Presentation may be selected from presentation of tasks, difference blocks, line-by-line, or a combination of any or all three. Actions available to reviewers for each presentation selection include accept, reject, and comment. For example, the reviewer may select a task to expand and look at the code associated with the task. The grouping of changes by task presents the changes to the reviewer in a logical order, i.e., a function is added, and the function is invoked in two places. The reviewer may accept, reject, and comment on the task as a whole, on each difference block being reviewed, and on each line of code. Once the reviewer has examined a change set, notice of the completed review is forwarded to the author developer.

Figure 4:
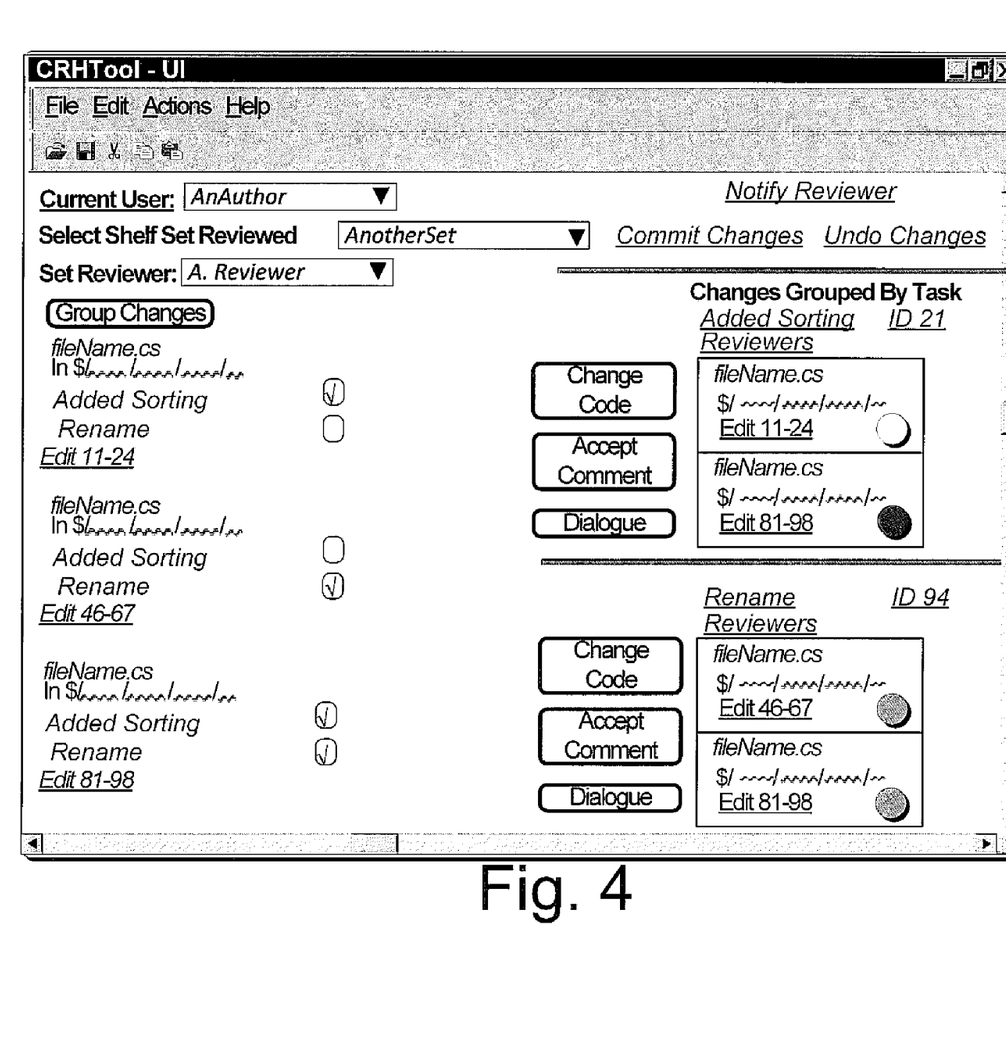
FIG. 4 illustrates another exemplary author/developer experience of one embodiment.

FIG. 4 is an exemplary screen shot illustrating an inventive interface the author/developer may use to respond to reviews, in accordance with one or more embodiments of tagging and logical grouping of items in source code change lists. Change sets for which a review has been received are available for selection. Once selected, changes are presented grouped by task and in at least one embodiment may also be presented grouped by reviewer. The presentations present a graphical representation of the status of each difference block within the task. For example, a task may contain three difference blocks. A difference block which the reviewer has accepted may have, e.g., a green visual representation indicating that the particular difference block is considered ready to be checked in and committed. A second difference block upon which the reviewer commented whether or not it was also accepted may have, e.g., a yellow visual representation indicating that the particular difference block may be checked in, but may not be ready for commit. A third difference block which the reviewer rejected whether or not it was also commented on may have, e.g., a red visual representation indicating that the particular difference block may be checked in, but is not be ready to be committed.

Based on the review as presented, the author may then be prompted to take further action regarding the code. Actions available may include further iterations of the Code Review History (CRH) Tool resulting in a dialog between the author/developer and one or more reviewers documenting the rationale for particular coding decisions.

Figure 5:
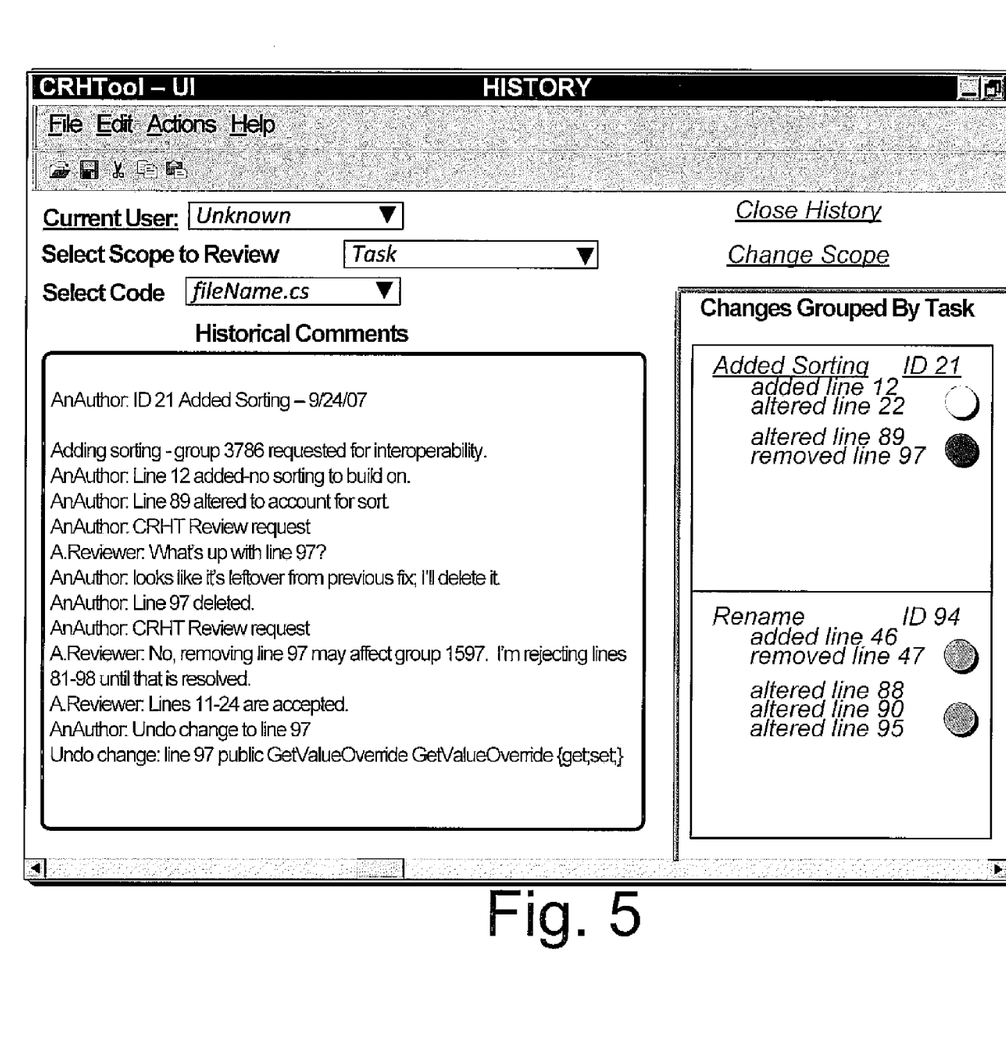
FIG. 5 illustrates an exemplary user interface of one embodiment.

FIG. 5 is an exemplary screen shot illustrating an inventive interface for viewing a history of selected code. The history can be viewed with a selected scope, i.e., by tasks, lines of code, methods, classes, files, etc. For each scope selected, task oriented presentation is provided and rationale during development is recoverable.

Exemplary System

Figure 6:
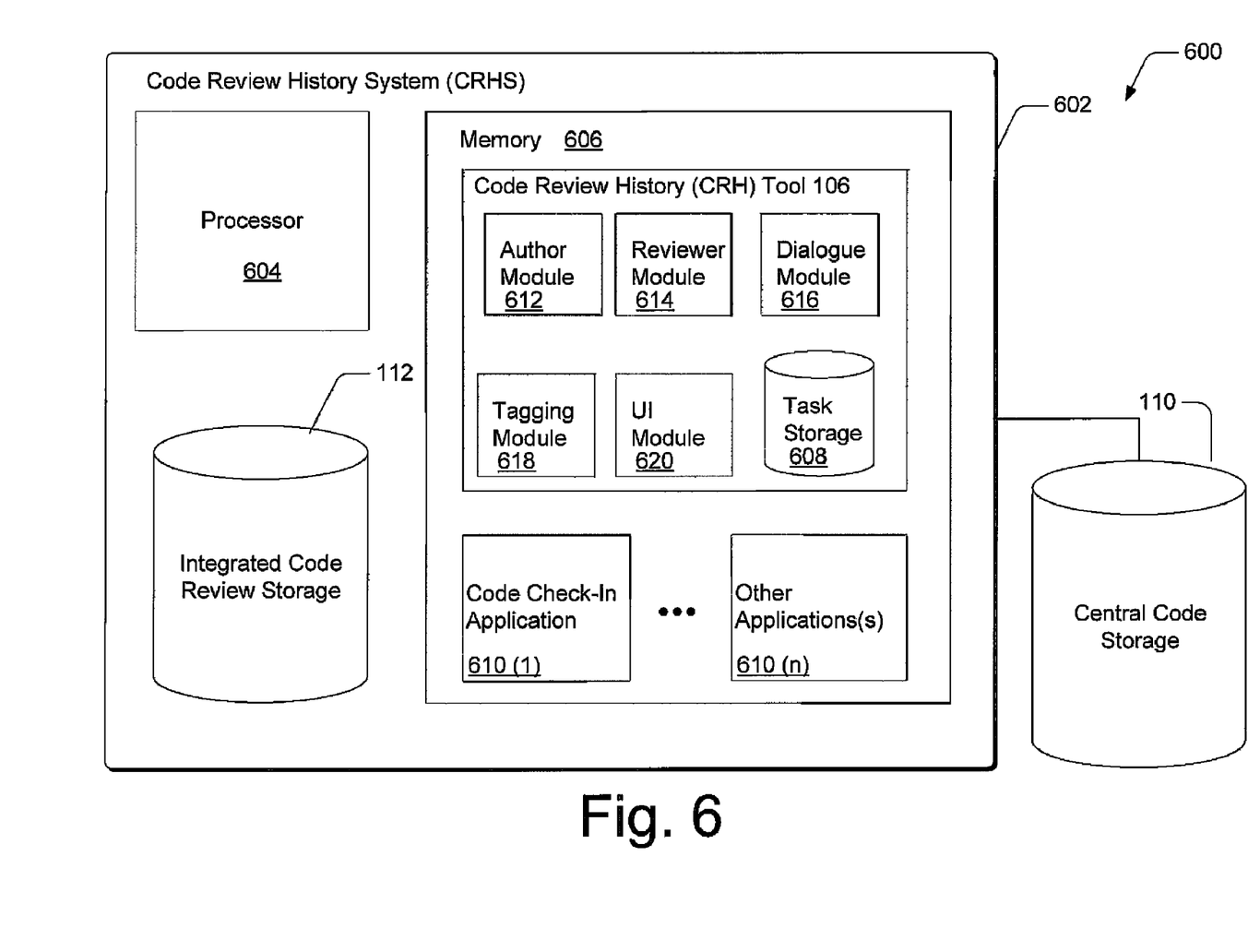
FIG. 6 illustrates an exemplary system of one embodiment.

FIG. 6 illustrates an exemplary code development environment generally at 600 comprising a Code Review History System (CRHS) 602 having one or more processor(s) 604 and one or more memories 606. Memory 606 may include a variety of computer-readable media. Computer-readable media can be any available media that can be accessed by a computing device such as computing device 102 and includes both volatile and nonvolatile media, removable and non-removable media. By way of example, and not limitations computer-readable media comprises computer storage media. "Computer storage media" includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device such as computing device 102.

Computing device 102 and reviewer computing device 104 may include a variety of computing devices, such as a cell phone, laptop computer, desktop computer, personal digital assistant, or server. Each computing device having at least one processor capable of accessing and/or executing instructions embodied on the computer-readable media. In at least one embodiment, the computer-readable media comprises or has access to a browser, which is a module, program, or other entity capable of interacting with a network-enabled entity. The computing device may also include input/output devices including a keyboard, mouse, microphone, printer, monitor, and speakers (not shown) usable to implement one or more embodiments of the tools described herein.

A Code Review History (CRH) Tool 106 may be embodied in one memory or across multiple memories. In at least one embodiment the CRHTool 106 includes a variety of modules. Modules of the CRHTool 106 may comprise an author module 612, a reviewer module 614, a dialogue module 616, a tagging module 618, and a user-interface (UI) module 620. In at least one embodiment the described modules may be separate from the CRHTool 106 and operatively coupled to the CRHTool 106.

The environment may also include one or more storage units comprising central code storage 110, integrated code review storage 112, and task storage 608. Alternatively, one or more of these storage units may be combined. In at least one embodiment, each of these storage units may be located separate from the CRHTool and accessible via a network. The memory may also include one or more applications 610, such as a code check-in application 610(1), which may be independent of, coupled to, integrated with, or a component of the CRHTool 106.

Exemplary Processes

Exemplary acts of operation are described herein with reference to FIGS. 7-10. As with all processes described herein, the order in which the acts are described and depicted in the corresponding figures is itself exemplary and should not be construed as limiting the order in which the actions occur.

Figure 7:
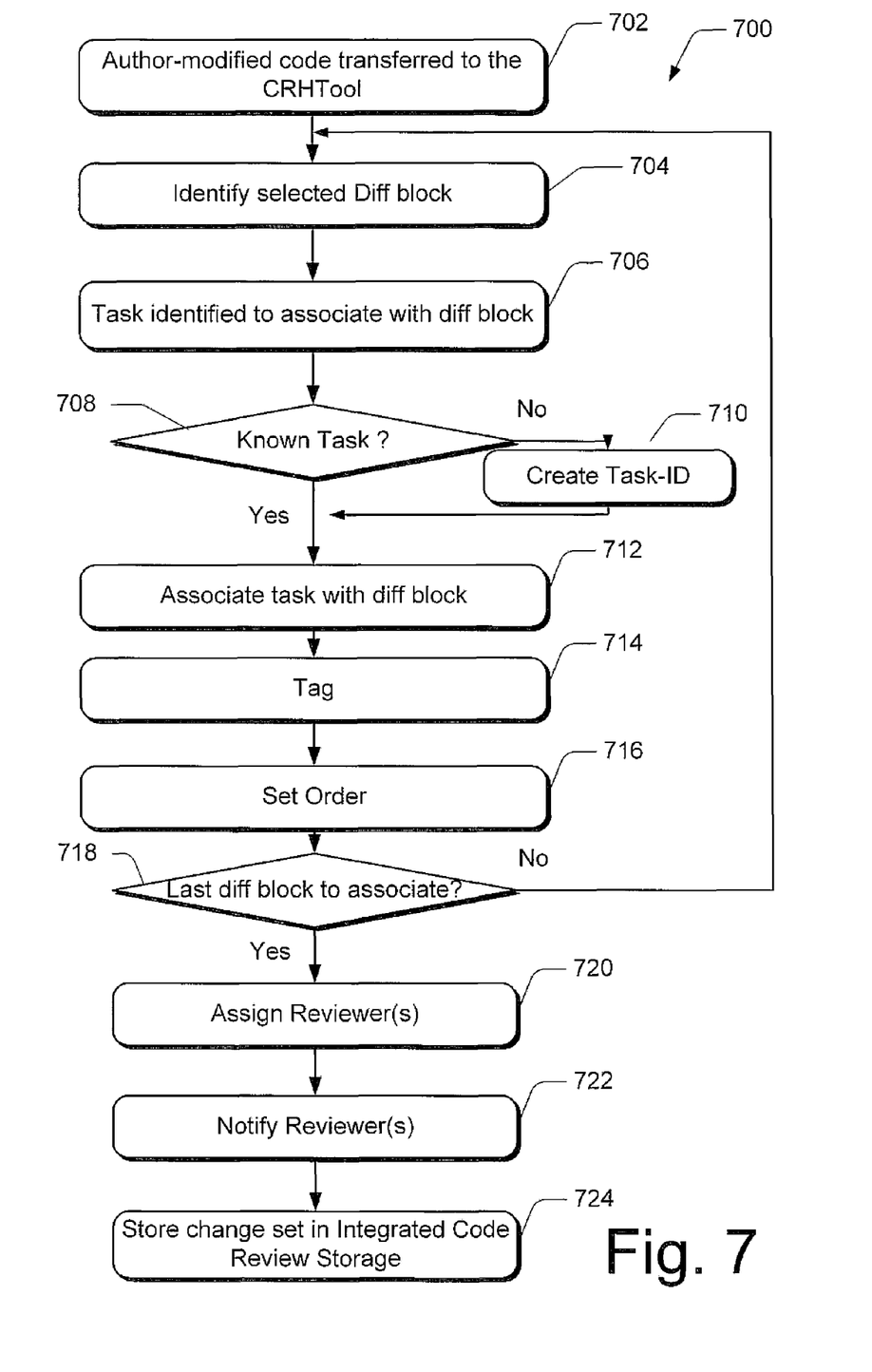
FIG. 7 is an exemplary process of code preparation utilizing one embodiment.

FIG. 7 is an exemplary process 700 describing at least one embodiment of tagging and logical grouping of items in source code change lists. This embodiment is illustrated as a series of blocks representing individual operations or acts performed by elements of operating environment 100 of FIG. 1, such as client 102 based on input from an author/developer (i.e., author 101). Process 700 may act in conjunction with or be an implementation of the Code Review History (CRH) Tool 106.

Block 702 represents author-modified code being transferred to the CRHTool. Author-modified code may be transferred from a local machine, such as client 102, central code storage 110, integrated code review storage 112, or elsewhere in a variety of manners such as via a network 108 or via a coupled computer readable medium (not shown). Upon the author-modified code being transferred, the CRHTool provides difference blocks for selection at block 704. At block 706, identification is made of a task to be associated with a selected difference block. A determination is made of whether the task to be associated is a known task at decision block 708. When the task to be associated is not known, at block 710, the task is created. Once the task is known, at block 712 the task is associated with the selected difference block. At block 714 the difference block is tagged with information such as a description of the change, an explanation of the rationale for how the change is accomplished, etc. Order of the difference block respective to other difference blocks associated with the task is set at block 716. A determination is made of whether additional difference blocks remain to be associated with tasks at decision block 718. When difference blocks remain to be associated or additional associations are desired further iterations ensue from block 704. When no difference blocks remain to be associated and no additional associates are desired one or more reviewers are assigned at block 720. Notification of reviewers takes place at block 722. Block 724 represents the change set being stored in integrated code review storage 112.

Figure 8:
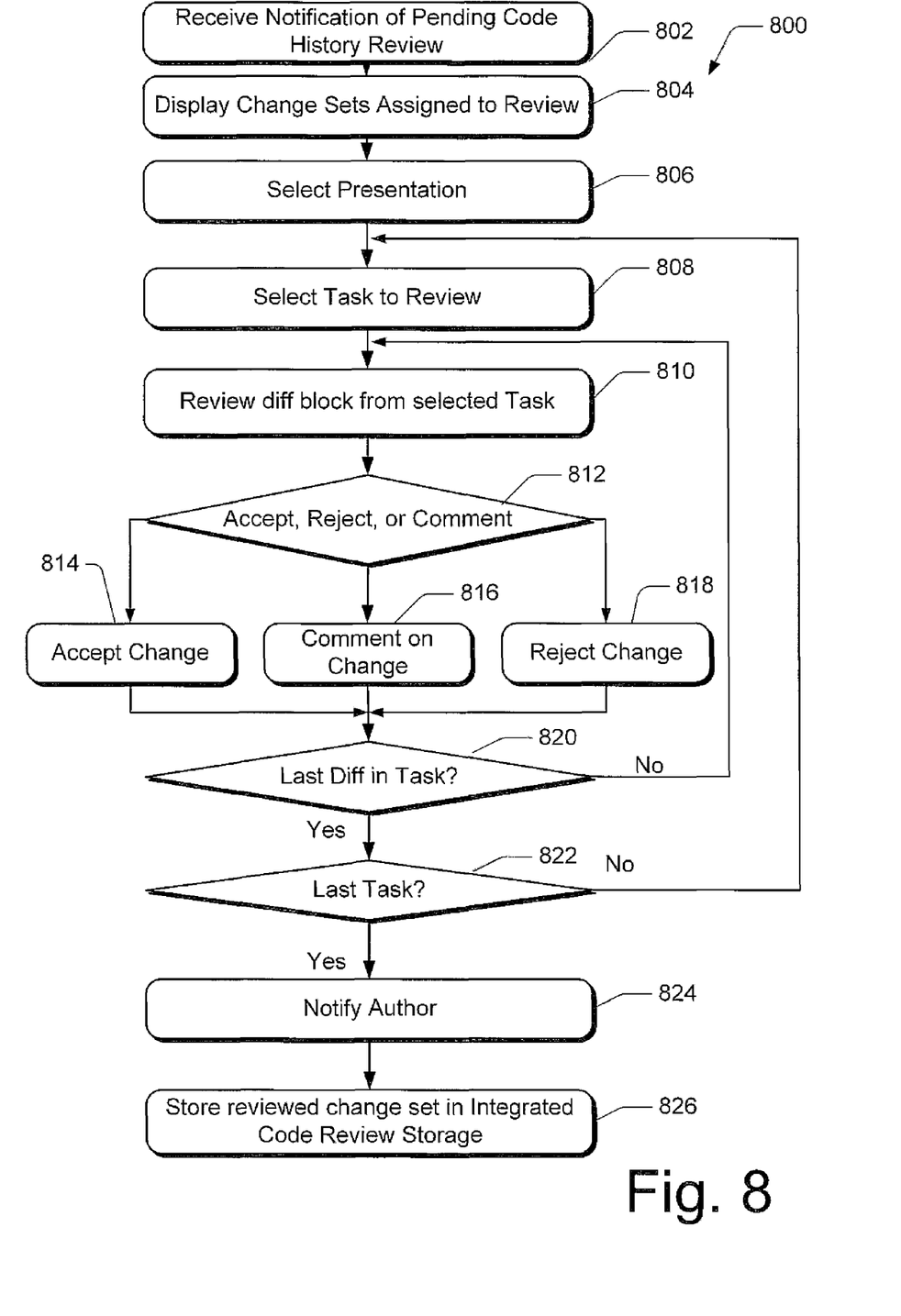
FIG. 8 is an exemplary process of code history review utilizing one embodiment.

FIG. 8 is an exemplary process 800 describing exemplary steps providing integration which leverages the knowledge generated during the code review process by facilitating capture and storage for later retrieval of reviewer rationale organized by specific tasks. The exemplary process is illustrated as a series of blocks representing individual operations or acts performed by elements of operating environment 100 of FIG. 1, such as a computing device used by a reviewer 104, based on input from a reviewer (i.e., reviewer 103). Process 800 may act in conjunction with or be an implementation of the Code Review History (CRH) Tool 106.

Block 802 represents notification of a pending code history for review. Each pending code history for review may be provided via an inventive integrated CRHTool 106, a CRHTool 106 accessed via a network 108, or via a coupled computer readable medium (not shown). Upon the notification of a pending code history review based on a triggering event, for example reviewer login at a computing device such as computing device 104 or entering impersonation mode, the CRHTool provides change sets assigned for review at block 804. At block 806, selection of presentation from a variety of levels of granularity, i.e., by task, difference block, line-by-line, and combinations thereof is provided. At block 808, the presentation granularity, i.e., tasks, for selection is provided. Review of a difference block from a selected task occurs at block 810. A determination is made of the action to take for each presentation selection at decision block 812. Accepting 814, rejecting 818, and commenting 816 actions are available at the presentation granularity and more fine included levels of granularity. For example, at a task presentation granularity, actions provided include accepting 814, rejecting 818, and commenting 816 on the task as a whole, on each difference block included in the task, and on each line of code. A determination is made of whether additional difference blocks remain to be reviewed from a selected task at decision block 820. When additional difference blocks remain to be reviewed from a selected task, further iterations ensue from block 810. A determination is made of whether additional tasks remain to be reviewed at decision block 822. When additional tasks remain to be reviewed further iterations ensue from block 808. When no additional tasks remain to be reviewed in the change set notification of the author(s) 102 takes place at block 824. Block 826 represents the reviewed change set being stored in integrated code review storage 106.

Figure 9:
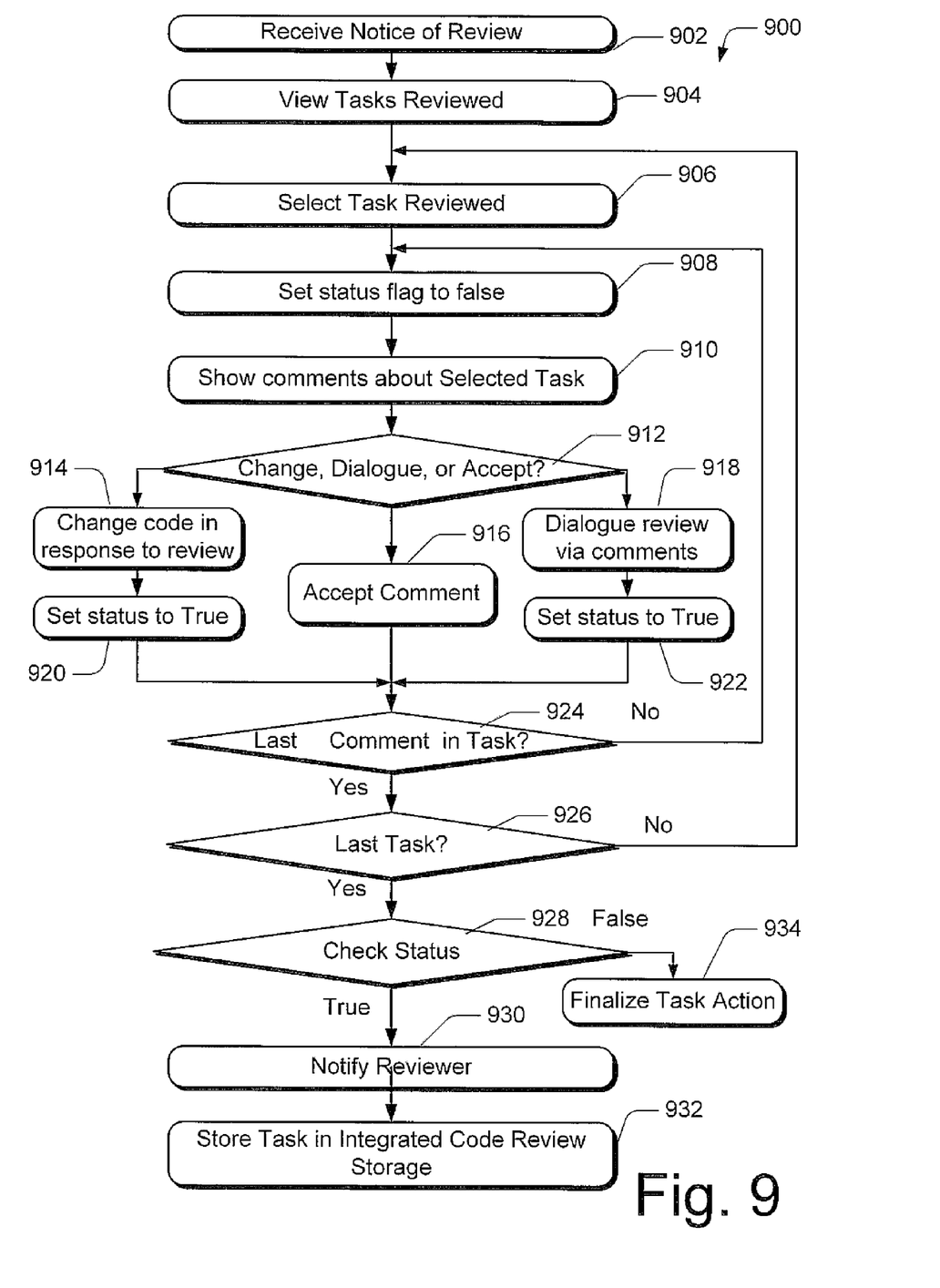
FIG. 9 is an exemplary process of task review utilizing one embodiment.

FIG. 9 is an exemplary process 900 describing exemplary steps providing intuitive presentation of changes and change sets based on the purpose of the change further leveraging the knowledge generated during the code review process by facilitating capture and storage for later retrieval of author/developer rationale organized by specific tasks. It is illustrated as a series of blocks representing individual operations or acts performed by elements of operating environment 100 of FIG. 1, such as a computing device used by author/developer 102 based on input from an author/developer (i.e., author 101). Process 900 may act in conjunction with or be an implementation of the Code Review History (CRH) Tool 106.

Block 902 represents notification of a pending code history having been reviewed. Each pending code history having been reviewed may be provided via an inventive integrated CRHTool 106, a CRHTool 106 accessed via a network 108, or via a coupled computer readable medium (not shown). Upon the notification of a pending code history having been reviewed based on a triggering event, for example author/developer 102 login, the CRHTool provides tasks which have been reviewed at block 904. At block 906 selection of a reviewed task is provided.

At block 908, a status flag is set. At block 910, comments for the selected reviewed task, i.e., all difference blocks and lines in task accepted or rejected, some difference blocks and lines in task accepted or rejected, and associated comments are provided. A determination is made of the action to take based on the status and comments at decision block 912. Subsequent to decision block 912, available actions include: changing code in response to review at block 914; accepting comments without changing code or reply commenting at block 916; and dialoguing the review via reply commenting at block 918. Upon a change to the code occurring at 914, the status flag is set to true at block 920. Similarly, upon commenting occurring at 918, the status flag is set to true at block 922. For example, a task reviewed presents questions about coding rationale from a reviewer; via the actions provided an author/developer may change code in response 914 and/or dialogue about the rationale 918, and one or more status flags will be set to false via 920 or 922. Within the same task, comments may be presented for which no change or reply is appropriate, in this example the author/developer may merely accept the comment 916.

A determination is made of whether additional actions remain to be taken for comments remaining from a selected task at decision block 924. When additional actions remain to be taken for comments remaining from a selected task, further iterations ensue from block 908. A determination is made of whether additional tasks remain to be selected that have been reviewed at decision block 926. When additional tasks remain to be selected further iterations ensue from block 906. At decision block 928 a determination is made regarding whether any code was changed at block 914 and whether any dialogue occurred at block 918 by examining the status flag(s) set at 920 or 922. When one or more status flags have been set to true via 920 or 922, notification of the reviewer(s) takes place at block 930. Block 932 represents the examined reviewed tasks in the change set being stored in integrated code review storage 106. When no status flags have been set to true via 920 or 922, action is taken to finalize a task at block 934

Figure 10:
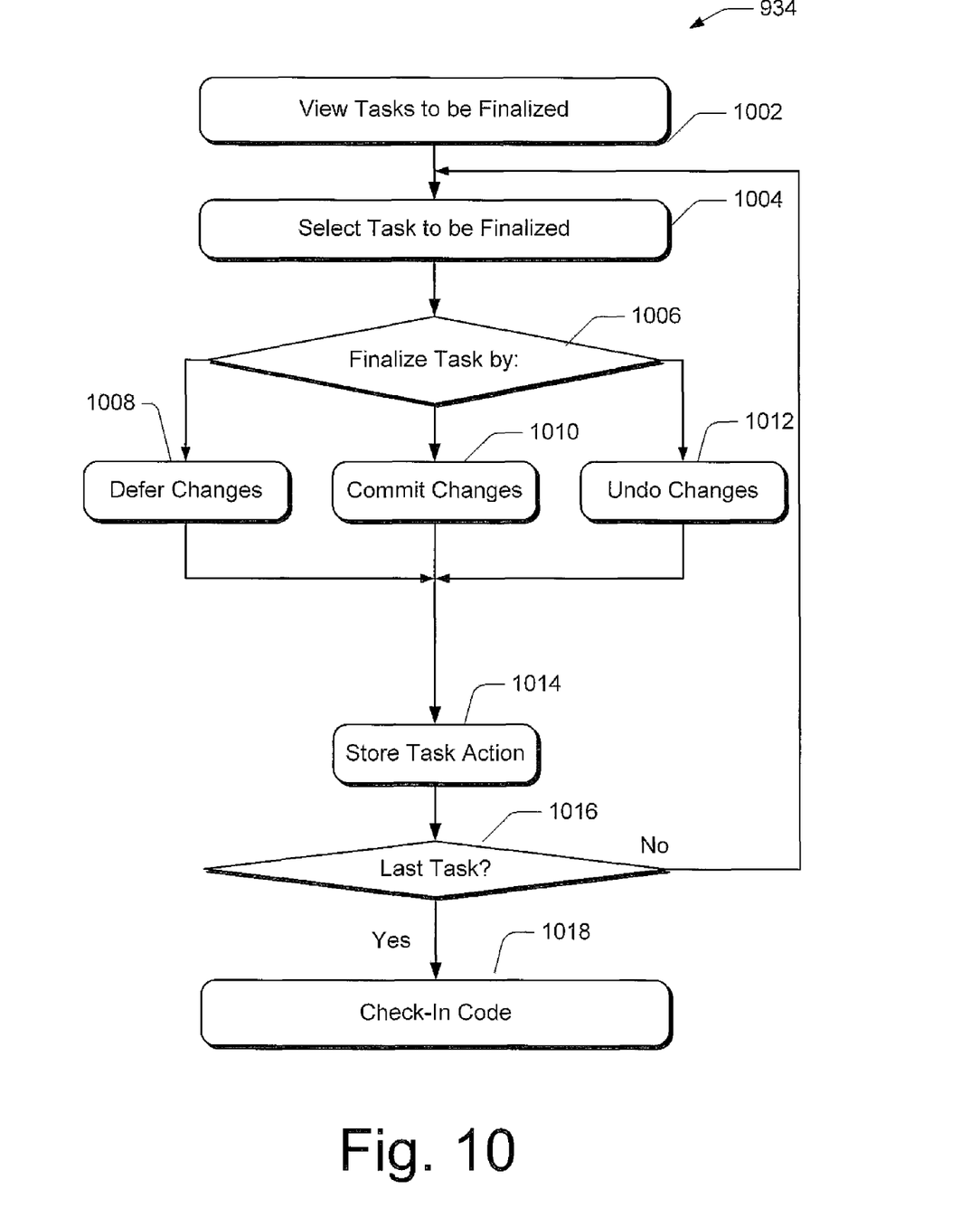
FIG. 10 is an exemplary process of task finalization utilizing one embodiment.

FIG. 10 is an exemplary expanded process of block 934 describing exemplary steps of finalization of tasks having undergone the previously described processes. FIG. 10, block 934, represents finalization of the knowledge generated during the code review process having been captured and stored for later retrieval of author/developer and reviewer rationale organized by specific tasks. The exemplary expanded process is illustrated as a series of blocks representing individual operations or acts performed by elements of operating environment 100 of FIG. 1, such as a computing device used by author/developer 102 based on input from an author/developer (i.e., author 101). Process 934 may act in conjunction with or be an implementation of the Code Review History (CRH) Tool 106.

Block 1002 represents viewing tasks ready to be finalized. Each task ready to be finalized may be provided via an inventive integrated CRHTool 106, a CRHTool 106 accessed via a network 108, or via a coupled computer readable medium (not shown). At block 1004 selection of a task to be finalized is provided. A determination is made of how to finalize changes in the selected task at decision block 1006. Actions to finalize chances in the selected task may include deferring changes at block 1008, committing changes at block 1010, and undoing changes at block 1012. At block 1014, the task action is stored. For example, a deferred change at block 1008 may result in creation of a new task item. The new task item may include the difference blocks existing at the time of deferral along with any associated dialogue being presented as textual representations thereby preserving the code review history of the deferred change, even as the code evolves. In another example, a committed change results in the changed code being stored, for example in the central code storage 110, and the associated code review history remaining accessible via the integrated code review storage 112. In yet another example, an undone change 1012, may result in code changes being backed out before the code is stored, for example in the central code storage 110, and the backed out code changes along with any associated dialogue may be preserved as textual representations accessible via the integrated code review storage 112. A determination is made of whether additional tasks remain to be finalized at decision block 1016. When additional tasks remain to be finalized, further iterations ensue from block 1004. When no tasks remain to be finalized the code may be checked in at block 1018.

CONCLUSION

The above-described systems and methods ("tools") enable tagging and logical grouping of items in source code change lists via a Code Review History (CRH) Tool, implemented independently or as a part of a Code Review History System (CRHS). These and other techniques described herein may provide significant improvements over the current state of the art, potentially providing more intuitive presentation of changes and change sets based on the purpose of the change via task-centric organization during code review and potentially providing information about author/developer and reviewer rationale as captured for concurrent and later retrieval.

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A code review history (CRH) tool comprising:
    a first component of the CRH tool, stored in memory, the first component comprising a representation of a user-defined organizational structure, the user-defined organizational structure comprising code grouped by task for review;
    a second component of the CRH tool, stored in memory, the second component comprising programmable code that is included in the user-defined organizational structure;
    a third component of the CRH tool, stored in memory, the third component comprising comments associated with the programmable code, the comments being included in the user-defined organizational structure; and
    a fourth component of the CRH tool containing data representing the user-defined organizational structure, wherein the data facilitates control of one or more of a plurality of modules, stored in memory, the fourth component representing one or more associations between at least a part of the programmable code and one or more elements of the user-defined organizational structure organized other than by file, wherein the one or more associations indicate whether a review cycle is complete, such that:
    in an event that the review cycle is not complete, incomplete difference blocks are prepared for further review; or
    in an even that the review cycle is complete, the user-defined organizational structure is prepared for storage.

2. The CRH tool of claim 1, wherein the user-defined organizational structure is accessible via a second user-defined organizational structure.

3. A user interface (UI) causing the CRH tool of claim 1 to be rendered on an output device, the UI comprising one or more of a plurality of areas comprising:
    an area facilitating selection of code for review;
    an area facilitating selection of code to tag;
    an area facilitating organization of tagged code;
    an area facilitating selection of organized code; or
    an area facilitating storage of code.

4. A system implementing the CRH tool of claim 1, the system comprising:
    a processor;
    a memory coupled to the processor; and
    the CRH tool embodied on the memory and operated by the processor.

5. A processor-readable storage medium having processor-readable instructions stored thereon, the processor-readable instructions, which when executed operably enable the CRH tool of claim 1.

6. The CRH tool of claim 1, wherein, responsive to a completed review cycle, the CRH Tool preserves comments and code changes via task association.

7. A computer-implemented method of facilitating tagging differences in preparation for task-grouped-code-review, the method comprising:
    receiving, via a graphical user interface, a tag identifying one or more difference blocks as part of a change set;
    for the one or more difference blocks, preparing the one or more difference blocks for task-grouped-code-review;
    prompting for assignment of at least one of a plurality of reviewers to review tasks associated with selected difference blocks, wherein more than one reviewer is assignable to the same task, and more than one task is assignable to the same reviewer;
    generating a presentation of the selected difference blocks for the task-grouped-code-review for a reviewer who is assigned to review at least one task;
    sending a notification to the reviewer who is assigned to review the at least one task;
    receiving notification that at least one task-grouped-code-review has been completed;
    for the completed task-grouped-code-review, determining whether a review cycle is complete, such that:
    in an event that the review cycle is not complete, preparing incomplete difference blocks for further task-grouped-code-review; or
    in an even that the review cycle is complete, preparing the task-grouped-code-review for storage; and
    storing the differences identified by tags with associated tasks in memory.

8. The method of claim 7, wherein the preparing identified difference blocks for task-grouped-code-review comprises determining whether at least one known task exists for association with the identified difference block.

9. The method of claim 7, wherein a set order is defined for tasks within the change set.

10. The method of claim 9, wherein a presentation order is further defined for difference blocks within the tasks.

11. The method of claim 7, wherein receiving notification that at least one task-grouped-code-review has been completed further comprises causing the review to be presented in an enhanced format.

12. The method of claim 7 further comprising:
    responsive to a completed review cycle determining further action, wherein further action comprises preserving comments and code changes via task association.

13. The method of claim 7, wherein receiving notification that at least one task-grouped-code-review has been completed further comprises causing the review to be presented in an enhanced format.

14. A processor-readable storage medium having processor-readable instructions stored thereon, the processor-readable instructions which when executed perform the method of claim 7.

15. A method facilitating task-grouped-code-review performed at least in part via computer interaction, the method comprising:
   receiving a computer generated notification indicating a particular reviewer of a plurality of reviewers is assigned to review a task with which differences are associated;
   presenting, via a graphical user interface, a list of tasks to which the particular reviewer is assigned;
   receiving, via an input device, a selection of a task to review;
   for differences associated with the selected task, presenting the differences associated with the selected task in a predefined order in the graphical user interface;
   responsive to each presented difference, prompting, via the graphical user interface, for one or more actions by the particular reviewer, the actions comprising:
      accepting the difference;
      rejecting the difference; and
      commenting on the difference;
      determining whether additional tasks remain to be selected;
         in an event at least one task remains to be selected, selecting a remaining task to review;
         in an event no tasks remain to be selected, ending the task-grouped-code-review;
   notifying an author of the differences reviewed that review by the particular reviewer is complete;
   storing results of the review by the particular reviewer; and
   determining whether a review cycle is complete, such that:
      in an event that the review cycle is not complete, preparing incomplete difference blocks for further task-grouped-code-review; or
      in an even that the review cycle is complete, preparing the task-grouped-code-review for storage.

16. The method of claim 15, wherein the code for review is grouped such that options for completing the review comprise:
   completing the review task-by-task;
   completing the review difference-by-difference; and
   completing the review line-by-line.

17. The method of claim 15, wherein the predefined order of presenting the differences associated with the selected task is a different order than the order the differences occur in the file.

18. A processor-readable storage medium having processor-readable instructions stored thereon, the processor-readable instructions, when executed, perform the method of claim 15.

19. The method of claim 15, further comprising, responsive to a completed review cycle, determining further action, wherein further action comprises preserving comments and code changes via task association.

* * * * *